Patented Apr. 14, 1953

2,635,091

UNITED STATES PATENT OFFICE 2,635,091

POLYMERIZATION METHOD

Costas H. Basdekis, Dayton, and George L. Wesp, Englewood, Ohio, assignors, by mesne assignments, to The Chemstrand Corporation, a corporation of Delaware No Drawing. Application August 20, 1949, Serial No. 111,574

9 Claims. (Cl. 260—85.5)

This invention relates to a new method of preparing valuable polymers of acrylonitrile. More specifically the invention relates to an efficient and practicable process for preparing uniform fiber forming copolymers of acrylonitrile and a polymerizable basic monomer by the aqueous dispersion technique.

Polyacrylonitrile and copolymers of acrylonitrile and other polymerizable olefinic monomers are well known to the art. Many useful methods have been proposed for their manufacture. If the acrylonitrile polymers are to be used in the fabrication of synthetic fiber many of the proposed methods are impracticable because of the non-uniformity of the physical and chemical properties of the polymer, and the discoloration inherent in the method of manufacture. Furthermore, many of the prior art methods require the use of high water-monomer ratios in order to maintain a sufficiently fluid condition in the reaction mass to assure adequate heat transfer. Some prior art methods of operation have achieved only partial success because of the loss of yield, the increase in reaction period or the increase of the impurities in the polymer.

The primary purpose of this invention is to provide an efficient polymerization process whereby a high yield of uniform and pure product may be formed. A further purpose of this invention is to provide an effective method of copolymerizing acrylonitrile and basic monomers, such as vinyl pyridine. A still further purpose of this invention is to provide a method of preparing acrylonitrile copolymers in aqueous media, with a minimum proportion of water in the reaction mass. A further purpose of this invention is to provide an effective polymerization method by which acrylonitrile copolymers may be obtained in a physical form which permits isolation of the polymer by simple filtration.

In copending application Serial No. 101,489, filed June 25, 1949, by Costas H. Basdekis, there is described and claimed a new method of preparing copolymers of acrylonitrile utilizing specific proportions of peroxide catalysts, specific proportions of alkali metal salts of mahogany acids as dispersing agents and, whereby it is possible to polymerize with unusually low water to monomer ratios. This specific procedure is not applicable for polymerizing acrylonitrile with basic monomers, such as vinyl pyridine.

It has been found that by the proper selection of reaction conditions low water to monomer ratios, for example as low as 1.5 to 1, may be achieved. This method is useful in preparing copolymers of 85 to 98 percent acrylonitrile and from 2 to 15 percent of basic monomers, such as 2-vinyl pyridine, 4-vinyl pyridine, methyl vinyl pyridine, other substituted vinyl pyridines, dimethylaminoethyl methacrylate, vinyl quinoline or other polymerizable vinyl monomers containing substituted therein basic amino groups, preferably tertiary amino groups.

The polymerization method requires as a dispersing agent an alkali metal salt of an aromatic sulfonic acid. Suitable dispersing agents are the sodium salt of a formaldehyde condensed mononaphthalene sulfonic acid, the sodium salt of a formaldehyde condensed alkylaryl sulfonic acid, and other water soluble salts of an aldehyde condensed alkylaryl or aryl sulfonic acid. Although any water soluble salt is useful as a dispersing agent, sodium salts are preferred. The dispersing agent may be used in proportions from 0.05 to 0.50 percent based on the weight of the monomer to be charged, and the optimum concentration is between 0.08 and 0.15 weight percent. The stabilizer may be charged to the polymerization reactor at the beginning of the reaction or it may be added continuously or periodically throughout the course of the reaction in order to achieve the desired concentration in the reaction mass.

The new reaction is catalyzed by means of an alkali metal persulfate, preferably potassium persulfate, which is used to the extent of 0.5 to 2 percent by weight of the monomer to be polymerized. The optimum catalyst concentration is from 0.8 to 1.5 percent, when the conditions of reaction are such as to utilize the catalyst efficiently. The reaction may be conducted by adding the catalyst to the aqueous medium prior to the introduction of monomer, but preferred operation utilizes a continuous or periodic addition of the catalyst so as to maintain approximately a uniform concentration in the reaction mass throughout the course of the reaction.

The new method, if desired, may utilize a conventional molecular weight regulator, for example t-dodecyl mercaptan and carbon tetrachloride, which may be added at the beginning of the reaction or during the reaction. Preferred operation utilizes a small concentration of catalyst, dispersing agent, and if desired, the regulator in the aqueous medium at the beginning of the reaction. The additional catalyst, dispersing agent and regulator are added continuously throughout the reaction by means of a suitable metering device for adding the agents at a uniform predetermined rate. The reaction is conducted at a temperature between 65° C. and 90° C. and is coordinated so that the reaction will be substantially completed when all of the desired lot of monomers have been added to the reaction mass. The rate of addition is fixed so that it will be completed within a desirable short reaction period, for example one to four hours. The reaction is controlled by the rate of addition of the monomer and the temperature is preferably the reflux temperature for the reaction mass. Under such conditions slight fluctuations of the temperature of reflux may occur as the reaction proceeds.

The new method may also be operated by maintaining constant reflux temperature and adding the monomers at a variable rate as is required to maintain the reflux temperature constant at all times. This manner of operation is described in copending application Serial No. 5,482, filed by George E. Ham on January 30, 1948.

In the practice of this invention prior to the introduction of the acrylonitrile, or mixture of acrylonitrile or other monomers, the water charged to the reactor is heated to approximately the temperature to which the polymerization is expected to proceed. The monomer stream then is introduced and the agitation begun. Almost immediately the reaction mass begins to boil, the evolved vapors being condensed and returned to the reactor. The reflux temperature may then be maintained by regulation of the monomer addition, or the reflux temperature may be permitted to seek its own level by continuing the monomer addition at a constant rate. In either case desirable fiber forming copolymers are obtained, but one or the other of these methods may be preferred under varying conditions of operation.

In the preparation of acrylonitrile copolymers the rate of polymerization of the acrylonitrile and other monomers will not be identical, and therefore one or the other may copolymerize more rapidly. The monomers, will however, combine in a fixed proportion which bears a definite relationship to the proportions of monomer in the reaction mixture. Thus, if a polymer of a uniform fixed monomer ratio is desired it will be necessary to maintain the proportion of monomers in the reaction mass substantially uniform throughout the reaction period. This condition is not always easily attained since it requires the pre-determination of the relationship between proportion of monomer in the reaction mass and the proportion of monomer polymerizing. An approximation of the ideal conditions may be obtained by charging the monomers in the ratios desired in the ultimate polymer at a rate only slightly in excess of the rate of consumption of monomers in the polymerization reaction. Under such conditions the first increment of polymer will be slightly different from that desired, but each successive increment will approach the desired proportions as the monomer proportions in the reaction mixture adjust themselves to that ratio which will produce the desired ultimate polymeric composition.

If desired, the ideal conditions of operation may be attained by initially charging to the reactor monomers in the proportion which will produce the desired ultimate copolymer, and thereafter charging the monomers in the proportions desired in the ultimate copolymer. Such operations will insure copolymers of the desired proportions throughout the entire reaction.

After all of the monomer charge has been added to the reactor it will be apparent that some unreacted monomers will still be present. Obviously if the polymerization continues, polymers of the desired composition cannot be formed, since the reaction mixture will become depleted with respect to the more reactive monomers. Thereafter the polymer composition will change in accordance with the changes in the proportion of monomers in the unpolymerized monomer. In order to avoid this changing proportion of monomer in the reaction mixture it is often desirable to interrupt the polymerization as soon as the last increment of monomer has been added. This interruption may be achieved by destroying one or more of the essential conditions of polymerization, for example by reducing the temperature, by adding a polymerization inhibitor or by rapid steam distillation of the mass to eliminate unreacted monomers. The interruption of the reaction as soon as the monomers are all added to the reactor will insure optimum polymer properties, although the practice does lower the yield.

These polymerizations are preferably conducted in glass or glass-lined steel vessels, which are provided with efficient means for agitation. Generally rotary stirring devices are more desirable, but other means for insuring intimate contact of reagents may be employed successfully, for example by rocking or tumbling the reactor. The polymerization equipment generally used is conventional in the art and may be varied to suit the type of reaction contemplated. Generally semi-continuous operation is preferred, that is, where a fixed lot of monomer is polymerized by continuous addition to the reactor and the entire charge removed when the reaction is completed. Fully continuous operation, wherein a portion of the polymer is periodically or continuously removed, may also be utilized. It is, however, essential in the practice of this invention that the proportions of dispersing agent, catalyst, water and monomer be maintained.

Further details of the practice of this invention are set forth with respect to the following specific examples.

*Example 1*

A glass reaction vessel provided with a rotary stirrer, a thermometer, and a reflux condenser was charged with 750 cc. of water, and 0.45 gram of the sodium salt of a formaldehyde condensed naphthalene sulfonic acid. The solution was heated to 80° C. and a previously prepared mixture of 414 grams of acrylonitrile, 36 grams of 2-vinyl pyridine, and 1.35 grams of t-dodecyl mercaptan were added over a period of two hours. A separately prepared catalyst solution of 4.5 grams of potassium persulfate dissolved in 150 cc. of water was also added gradually throughout the reaction period. The rotary stirrer was operated at approximately 200 R. P. M., and the reaction temperature remained between 75 and 85° C. After the polymerization had been completed the mixture was steam distilled to separate unreacted monomer. The polymer so obtained was in the form of fine particles which could easily be isolated by simple filtration without the use of coagulation or agglomeration treatments. The specific viscosity of the dry solid was 0.18 C. P. S. measured as a 0.10 percent solution in dimethylformamide at 25° C. The resin was spun into fibers which dyed readily. The identical procedure without the use of the regulator produced a polymer of specific viscosity, 0.27 C. P. S.

Example 2

The procedure of the preceding example was repeated, except that 5-ethyl 2-vinyl pyridine was used in place of 2-vinyl pyridine and no regulator was employed. The polymer, which was separated from the aqueous medium readily by filtering, was a fine free-flowing polymer of uniform physical and chemical properties. The specific viscosity of the polymer was measured as a 0.10 percent solution in N,N-dimethylformamide and found to be 0.27 C. P. S. at 25° C.

The invention is defined by the following claims.

What is claimed is:

1. A method of preparing a polymer of 85 to 98 percent by weight of acrylonitrile and from two to 15 percent of a vinyl monomer substituted with a basic amino group, which comprises gradual addition of the monomers in the desired proportions to an aqueous medium at a temperature of 65° to 90° C. in the presence of from 0.05 to 0.5 percent of a water-soluble salt of an aldehyde condensed naphthalene sulfonic acid, and in the presence of from 0.5 to 2 percent of an alkali metal persulfate, said percentages being based on the weight of the monomers to be charged.

2. A method of preparing a polymer of 85 to 98 percent by weight of acrylonitrile and from two to 15 percent of a vinyl monomer substituted with a basic amino group, which comprises gradual addition of the monomers in the desired proportions to an aqueous medium at a temperature of 65° to 90° C. in the presence of from 0.08 to 0.15 percent of a water-soluble salt of an aldehyde condensed naphthalene sulfonic acid, and in the presence of from 0.8 to 1.5 percent of an alkali metal persulfate, said percentages being based on the weight of the monomers to be charged.

3. A method of preparing a copolymer of from 85 to 98 percent by weight of acrylonitrile and from 2 to 15 percent of a compound of the group consisting of the vinyl pyridines and the alkyl-substituted vinyl pyridines, which comprises adding the monomers in the desired proportions gradually to an aqueous medium at a temperature of 65° to 90° C. in the presence of from 0.05 to 0.5 percent of a water-soluble salt of an aldehyde condensed naphthalene sulfonic acid, and in the presence of from 0.5 to 2 percent of an alkali metal persulfate, said percentages being based on the weight of the monomers to be charged.

4. The method as defined in claim 3 wherein there is employed from 2 to 15 percent of 2-vinyl pyridine.

5. The method as defined in claim 3 wherein there is employed from 2 to 15 percent of 4-vinyl pyridine.

6. The method as defined in claim 3 wherein there is employed from 2 to 15 percent of 4-methyl-2-vinyl pyridine.

7. A method of preparing a copolymer of from 85 to 98 percent by weight of acrylonitrile and from two to 15 percent of a compound of the group consisting of the vinyl pyridines and the alkyl-substituted vinyl pyridines, which comprises adding the monomers in the desired proportions gradually to an aqueous medium at a temperature of 65° to 90° C. in the presence of from 0.08 to 0.15 percent of a water-soluble salt of an aldehyde condensed naphthalene sulfonic acid, and in the presence of from 0.8 to 1.5 percent of an alkali metal persulfate, said percentages being based on the weight of the monomers to be charged.

8. A method of preparing a polymer of 85 to 98 percent by weight of acrylonitrile and from two to 15 percent of a vinyl monomer substituted with a basic amino group, which comprises mixing the monomers in the desired proportions and adding them gradually to water at a temperature of 65° to 90° C. in the presence of from 0.05 to 0.5 percent of a water-soluble salt of an aldehyde condensed naphthalene sulfonic acid, and in the presence of from 0.5 to two percent of an alkali metal persulfate, said percentages being based on the weight of the monomers to be charged.

9. A method of preparing a copolymer of from 85 to 98 percent by weight of acrylonitrile and from two to 15 percent of a compound of the group consisting of the vinyl pyridines and the alkyl substituted vinyl pyridines, which comprises mixing the monomers in the desired proportions and adding them gradually to water at a temperature of 65° to 90° C. in the presence of from 0.08 to 0.15 percent of a water-soluble salt of an aldehyde condensed naphthalene sulfonic acid, and in the presence of from 0.8 to 1.5 percent by weight of an alkali metal persulfate, said percentages being based on the weight of the monomers to be charged.

COSTAS H. BASDEKIS.
GEORGE L. WESP.

References Cited in the file of this patent

UNITED STATES PATENTS

| Number | Name | Date |
| --- | --- | --- |
| 2,123,599 | Fikentscher et al. | July 12, 1938 |
| 2,420,330 | Shriver et al. | May 13, 1947 |
| 2,456,360 | Arnold | Dec. 14, 1948 |
| 2,486,241 | Arnold | Oct. 25, 1949 |
| 2,491,471 | Arnold | Dec. 20, 1949 |
| 2,537,031 | Chaney | Jan. 9, 1951 |